United States Patent [19]
Belinky et al.

[11] Patent Number: 6,006,973
[45] Date of Patent: *Dec. 28, 1999

[54] HITCH MOUNTED CARGO CARRIER BIKE RACK ADAPTER

[75] Inventors: Jacob S. Belinky, Carleton; David L. Rogers, Canton, both of Mich.

[73] Assignee: Draw-Tite, Inc., Canton, Mich.

[ * ] Notice: This patent is subject to a terminal disclaimer.

[21] Appl. No.: 08/957,640

[22] Filed: Oct. 24, 1997

Related U.S. Application Data

[60] Provisional application No. 60/029,642, Oct. 28, 1996.

[51] Int. Cl.⁶ .................................. B60R 9/06; B60R 9/10
[52] U.S. Cl. ........................ 224/510; 224/500; 224/521; 224/524; 224/525; 224/526; 224/529; 224/534; 224/924
[58] Field of Search ..................................... 224/495, 500, 224/510, 924, 521, 524, 525, 526, 527, 528, 529, 530, 534

[56] References Cited

U.S. PATENT DOCUMENTS

| | | |
|---|---|---|
| 1,498,715 | 6/1924 | Benoist . |
| 3,251,520 | 5/1966 | Van Dyke et al. . |
| 3,563,200 | 2/1971 | Grossman . |
| 3,998,285 | 12/1976 | Cooper . |
| 4,072,257 | 2/1978 | Hall . |
| 4,411,461 | 10/1983 | Rosenberg . |
| 4,676,414 | 6/1987 | Deguevara . |
| 4,823,997 | 4/1989 | Krieger . |
| 4,856,686 | 8/1989 | Workentine . |
| 4,906,015 | 3/1990 | LaCroix et al. . |
| 5,038,983 | 8/1991 | Tomososki . |
| 5,129,559 | 7/1992 | Holliday . |
| 5,169,042 | 12/1992 | Ching . |
| 5,377,886 | 1/1995 | Sickler . |
| 5,427,289 | 6/1995 | Ostor . |
| 5,460,304 | 10/1995 | Porter et al. . |
| 5,497,927 | 3/1996 | Peterson . |
| 5,520,315 | 5/1996 | Graham . |
| 5,586,702 | 12/1996 | Sadler ...................................... 224/495 |

FOREIGN PATENT DOCUMENTS

| | | | |
|---|---|---|---|
| 2642024 | 7/1990 | France ................................... | 224/521 |

*Primary Examiner*—Linda J. Sholl
*Attorney, Agent, or Firm*—Leon E. Redman; Lloyd D. Doigan

[57] ABSTRACT

A bike rack cargo carrier for mounting to a vehicle hitch allowing bicycles to be transported outside the vehicle. The bike carrier includes a drawbar adapted to be received within the vehicle hitch and a cargo platform adjustably attached to the drawbar to facilitate fore and aft adjustment of the platform relative to the rear of the vehicle. The drawbar is provided with a vertical offset to position the platform further from the ground. A support stanchion is removably secured to the carrier platform to transport a plurality of bicycles in a vertical position. The stanchion is adjustably mounted to the platform to accommodate different numbers of bikes.

14 Claims, 5 Drawing Sheets

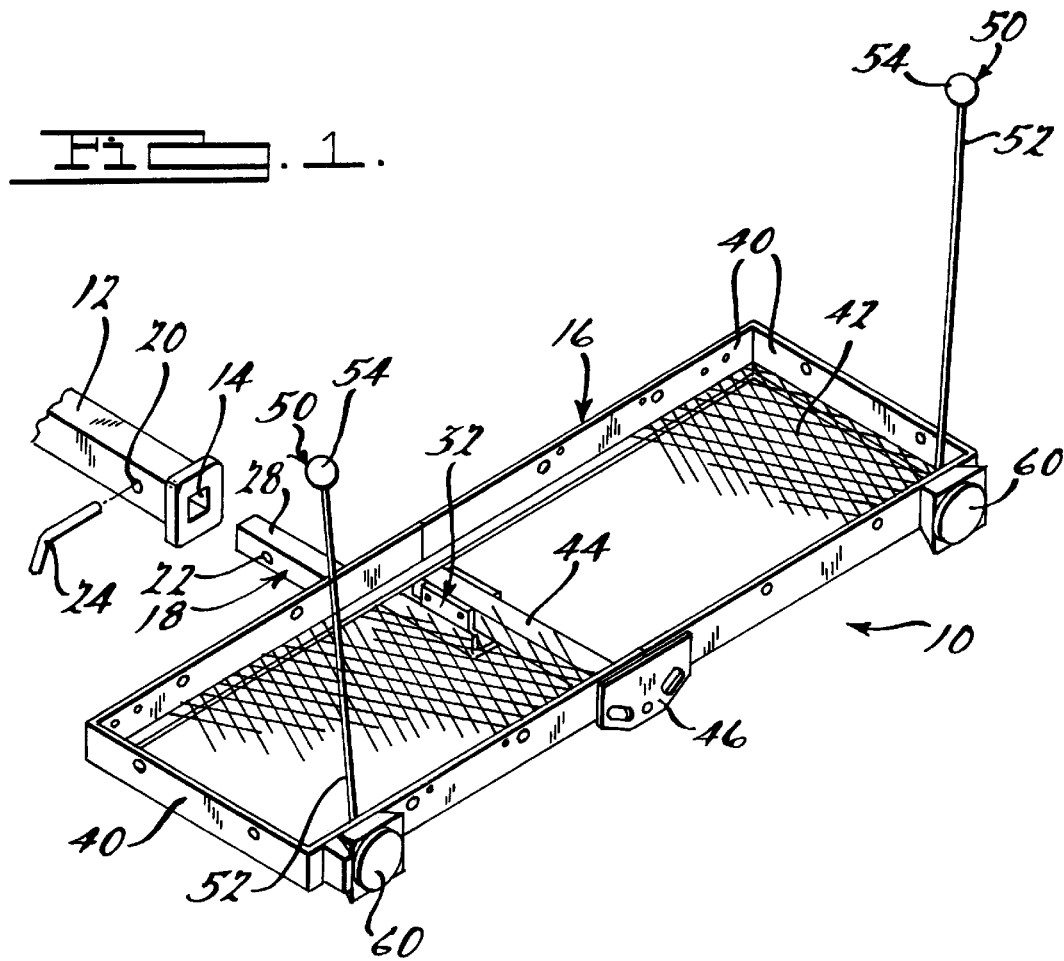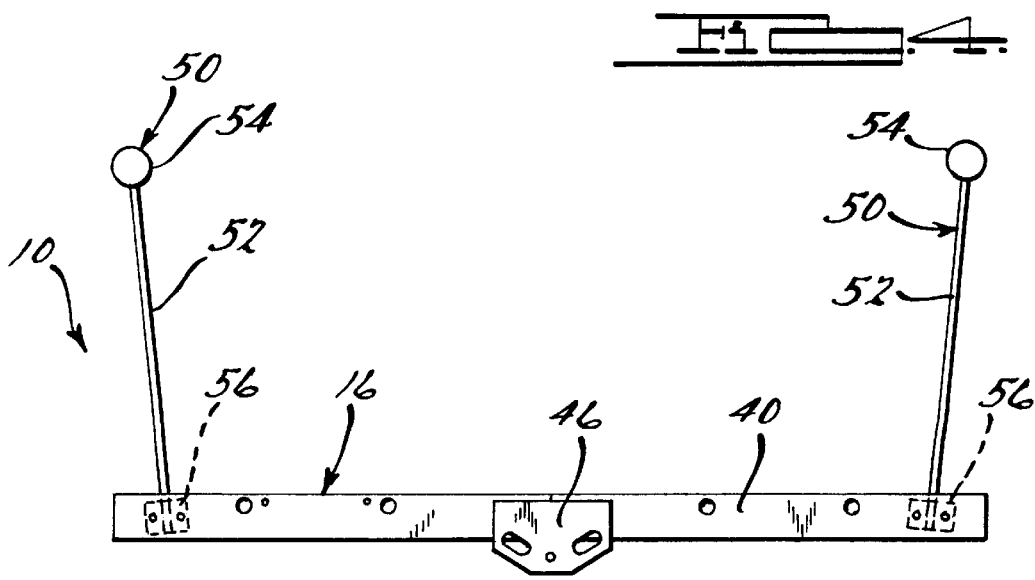

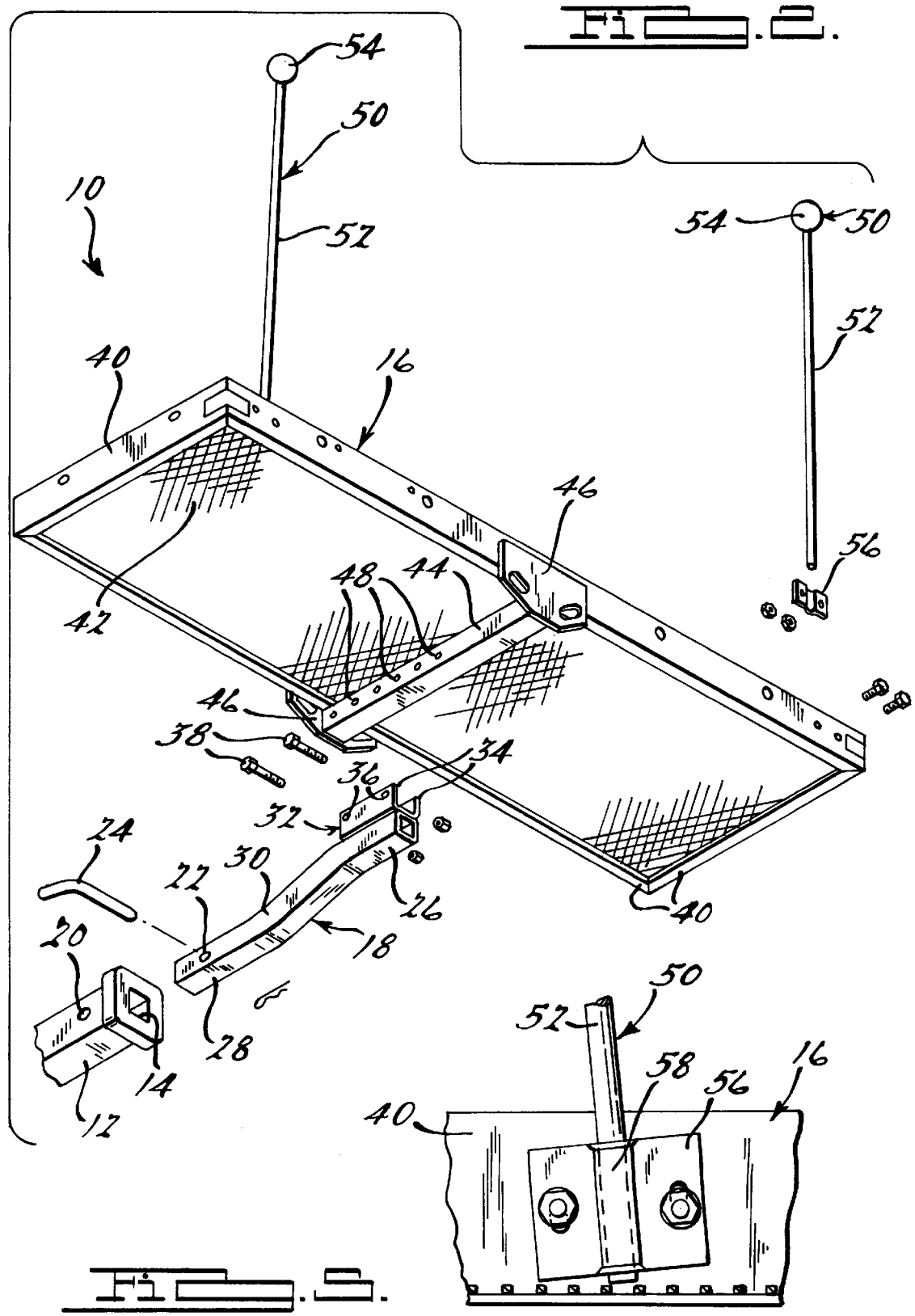

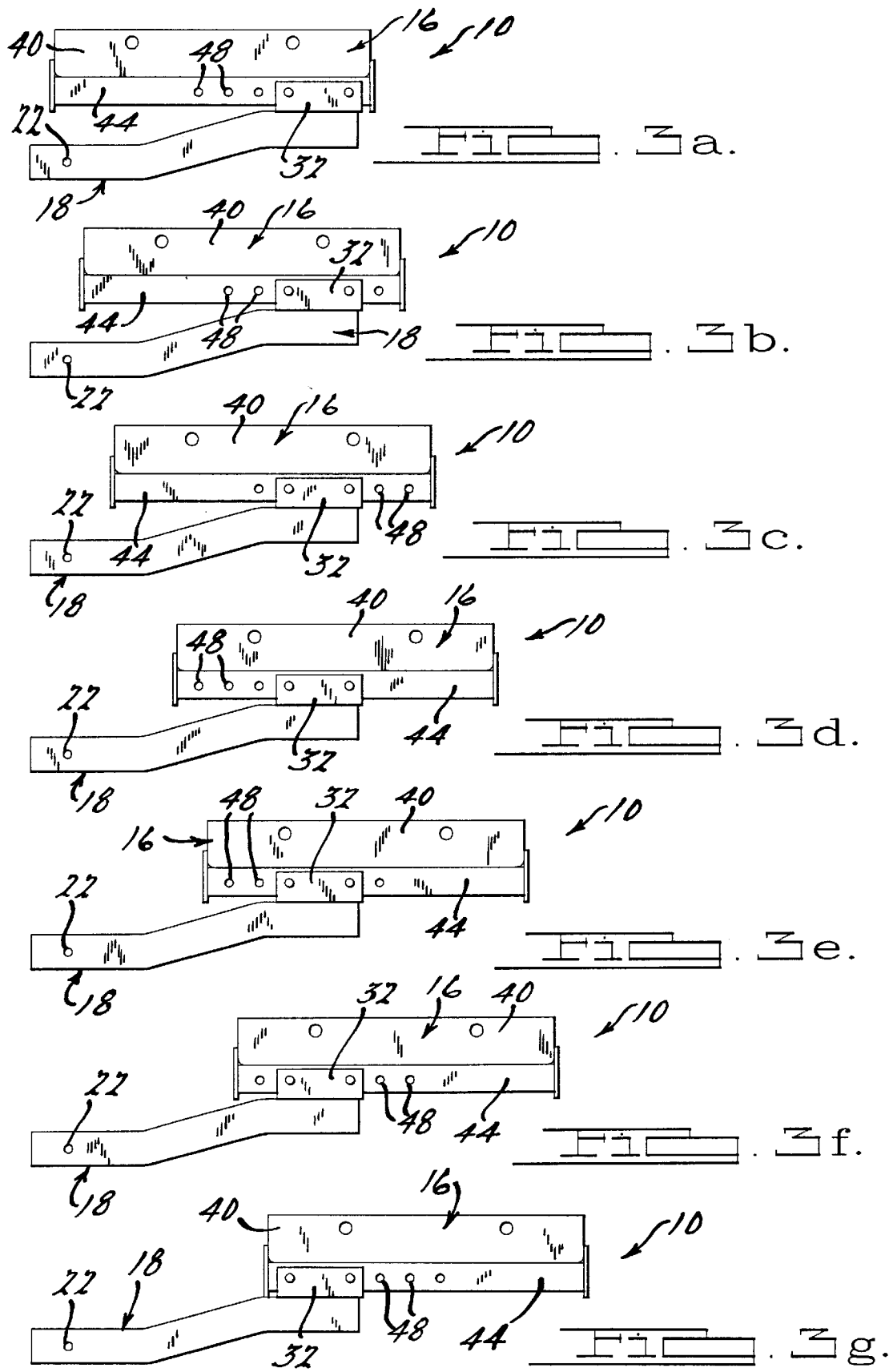

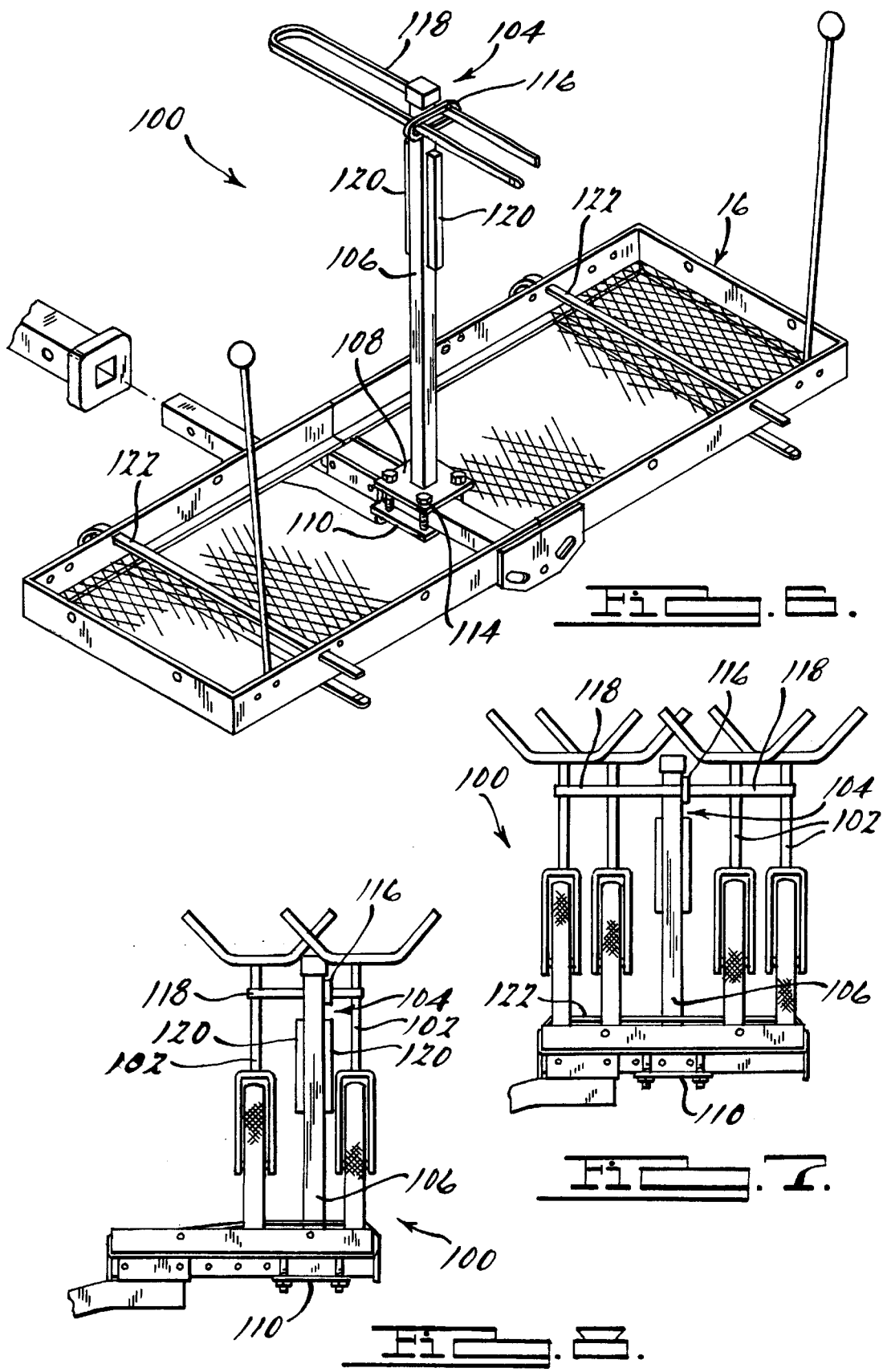

6,006,973

HITCH MOUNTED CARGO CARRIER BIKE RACK ADAPTER

This application claims priority from U.S. Provisional Application No. 60/029,642 filed on Oct. 28, 1996.

BACKGROUND OF THE INVENTION

I. Field of the Invention

This invention relates to cargo carriers for vehicles and, in particular, to a hitch mounted bike rack capable of adjustment fore and aft relative to the vehicle to optimize the position of the carrier platform.

II. Description of the Prior Art

Article carriers are widely employed to expand the carrying capacity of vehicles while maintaining comfort within the passenger compartment. Rooftop carriers are well known although access can be cumbersome particularly with taller vehicles. Moreover, rooftop carriers are dependent upon the structural strength of the vehicle roof and therefore may be limited in their carrying capacity. Rear mounted cargo carriers have also been employed to increase the cargo capacity of the vehicle. Many require specialized mounting hardware to secure the carrier to the vehicle resulting in undesirable added structure and cost. Some of the prior known cargo carriers are attachable to the vehicle hitch but do not provide any flexibility in the positioning of the carrier to accommodate the wide variety of vehicle configurations. Cargo platforms which simply extend from the hitch assembly could be damaged by contact with the ground as the vehicle moves along an inclined surface such as a driveway. Similarly, the rear portion of the vehicle may include obstructions to full utilization of the carrier such as the spare tire on utility vehicles. It is desirable to optimally position any cargo carrier to ensure full capacity yet minimize the cantilever forces applied to the hitch assembly.

SUMMARY OF THE PRESENT INVENTION

The present invention overcomes the disadvantages of the prior known bike carriers by providing a platform which is adjustably attached to a vertically offset drawbar received in the vehicle hitch assembly to allow selective positioning of the platform relative to the vehicle while also raising the platform to increase ground clearance.

The hitch mounted cargo carrier generally comprises a drawbar removably received by a vehicle hitch assembly and a cargo platform adjustably attached to the drawbar. The drawbar has a vertical offset in order to raise the platform above the hitch for increased ground clearance. The outer end of the drawbar includes a bracket for receiving a central beam of the cargo platform. The platform is removably connected to the drawbar bracket by fasteners which extend through apertures in the bracket and one of a plurality of apertures disposed longitudinally along the beam. The position of the platform relative to the drawbar and therefore the rear of vehicle may be adjusted by utilizing different apertures along the central beam. In a preferred embodiment, the apertures extend only along a portion of the beam to reduce manufacturing costs. However, positioning along the full width of the platform can be accomplished by rotating the platform 180° to utilize the apertures.

A preferred embodiment of the platform includes a rectangular frame secured to the central beam and a mesh support surface to minimize accumulation of moisture. Reflectors or lights electrically connected to the vehicle taillights may be mounted along the rear edge of the frame. In order to provide a visual indication of the location of the cargo carrier, corner markers are attached to the platform. The markers extend upwardly from the platform and are positioned directly over the outer corners of the carrier so as to be seen through the windows and rear view mirrors of the vehicle.

In order to convert the cargo carrier to a rack suitable for maintaining a plurality of bikes at the rear of the vehicle, a vertical support is mounted to the platform and central beam. The support includes a base plate which cooperates with a backing plate to sandwich the central beam. The support may be mounted anywhere along the central beam rearwardly of the drawbar to allow flexibility in mounting from one to four bicycles on the carrier. An upper end of the support includes a loop to which the bicycle frames may be tied or fastened. To further retain the bicycles, the platform frame can include straps adapted to tie down the wheels of the bikes. Thus, the bike rack adapter provides a convenient structure for transporting up to four bicycles in a vertical position proximate the rear of the vehicle.

Other objects, features and advantages of the invention will be apparent from the following detailed description taken in accordance with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a perspective view of a cargo carrier embodying the present invention and adapted to be mounted to a vehicle hitch;

FIG. 2 is an exploded view of the cargo carrier;

FIGS. 3a through 3g illustrate various mounting positions of the platform relative to the drawbar of the cargo carrier;

FIG. 4 is a rear elevational view of the cargo carrier;

FIG. 5 is an enlarged view of a mounting bracket for the corner markers of the cargo carrier;

FIG. 6 is a perspective view of the cargo carrier converted to a bicycle rack;

FIG. 7 is a side view of the bicycle rack illustrating bicycles in one orientation;

FIG. 8 is a side view of the bicycle rack illustrating bicycles in another orientation.

DETAILED DESCRIPTION OF PREFERRED EMBODIMENT OF THE PRESENT INVENTION

Figure 9:
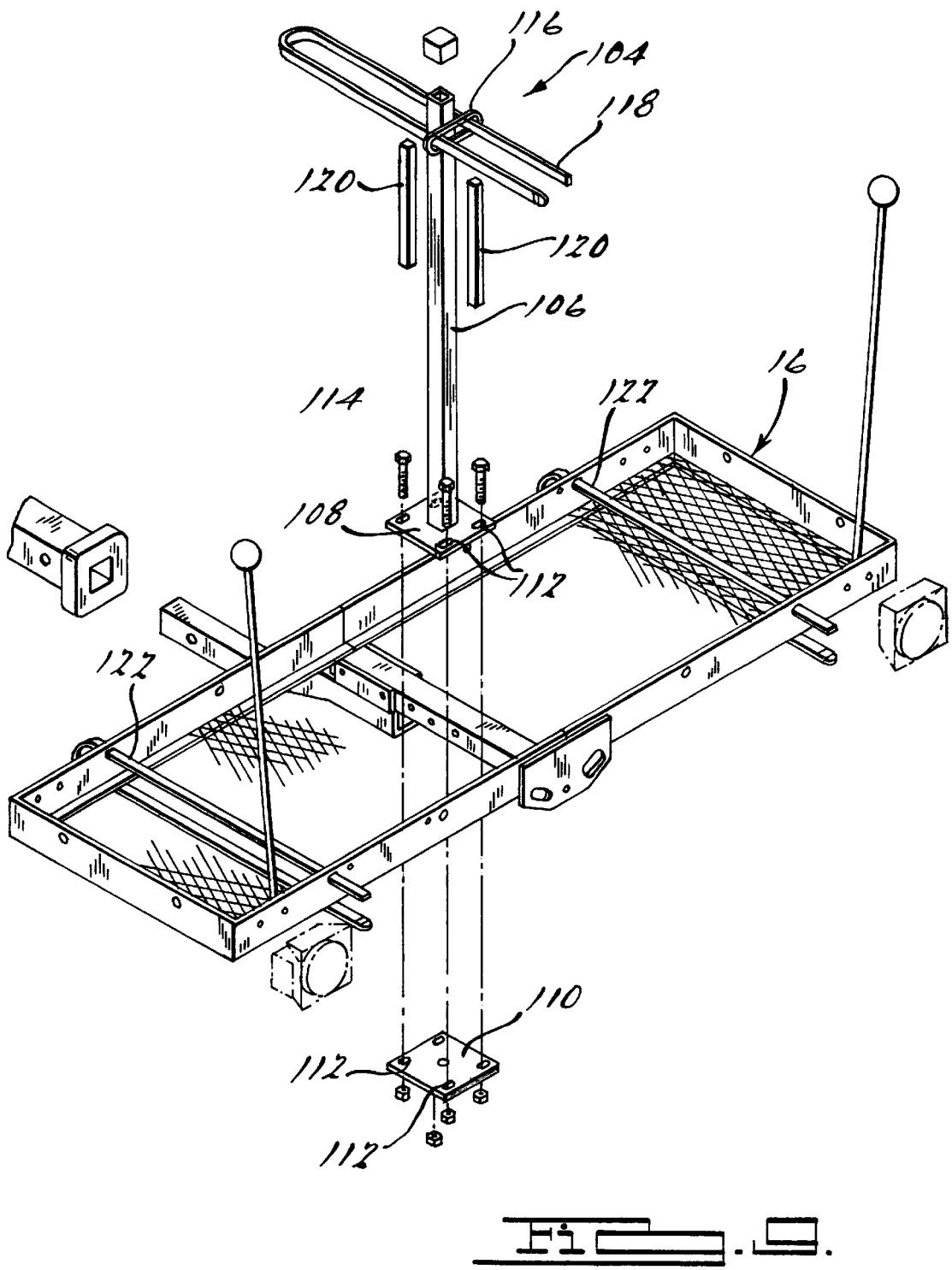
FIG. 9 is an exploded view of the bicycle carrier embodying the present invention.

Referring first to FIGS. 1 through 4, there is shown a cargo carrier 10 for mounting to a hitch assembly 12 of a vehicle (not shown). Preferably, the hitch assembly 12 is a receiver style hitch having a sleeve 14 fixedly mounted to the vehicle. The hitch assembly 12 extends rearwardly from the vehicle in order to position the cargo carrier 10 proximate the rear bumper of the vehicle for convenient access and loading of the carrier 10. In accordance with the present invention, the cargo carrier 10 may be removed to allow use of the hitch 12 for towing purposes.

The cargo carrier 10 generally includes a platform 16 adjustably connected to a drawbar 18 adapted to be matingly received within the hitch sleeve 14. The hitch sleeve 14 and drawbar 18 include apertures 20,22 for receiving a locking pin 24 to secure the drawbar 18 within the hitch sleeve 14. As a result, the drawbar 18 extends longitudinally from the hitch 12 rearwardly of the vehicle. The drawbar 18 of the preferred embodiment is provided with a vertical offset such that an outer end 16 of the drawbar 18 is disposed higher than an inner end 28 received within hitch 12. Extending between the outer end 16 and inner end 28 is an angled intermediate portion 30 to form the offset. Secured to the outer end 26 of the drawbar 18 is a mounting bracket 32. In a preferred embodiment, the mounting bracket 32 is U-shaped with upwardly extending side walls 34 having apertures 36 for receiving appropriate fasteners 38. However, alternative bracket configurations may be utilized. The vertical offset of the drawbar 18 is designed to raise the cargo platform 16 relative to the ground for increased clearance.

The platform 16 preferably includes a rectangular frame 40 with a metal mesh bottom 42 supported on a central beam 44. Reinforcement plates 46 may be used to further secure the central beam 44 to the frame 40. The metal mesh bottom 42 prevents water from accumulating within the platform 16 although a substantially solid bottom could be utilized. The central beam 44 of the platform 16 is intended to be removably received within the bracket 32 of the drawbar 18. The central beam 44 includes a plurality of throughbores or apertures 48 preferably along only a portion of the length of the central beam 44. The apertures 48 define discrete mounting positions of the platform 16 to the drawbar bracket 32 in order to optimally position the cargo platform 16 relative to the rear of the vehicle. As best shown in FIGS. 3a through 3g, the position of the platform 16 relative to the drawbar 18, and therefore, relative to the hitch 12 and the rear of the vehicle, can be altered by securing the bracket 32 to different apertures 48 along the central beam 44. The platform 16 can be disposed in close proximity to the hitch 12 as shown in 3a and progressively outwardly along the apertures 48. In the event the platform 16 must be positioned still further away from the hitch, the platform 16 can be rotated 180 degrees as shown in 3d–3g to utilize the apertures 48 of the beam 44 in an alternative orientation. FIG. 3g shows the platform 40 at the extreme cantilevered position. Although the adjustment feature allows the cargo carrier 10 to fit a greater number of vehicles, it is preferred that the platform 16 be positioned close to the vehicle bumper to reduce the stress on the hitch assembly 12.

An additional feature of the present invention is the visual markers 50 attached to the platform 16 to provide a continuous indication of the position of the outer corners of the cargo carrier 10 as shown in FIGS. 4 through 19. The markers 50 generally include a relatively stiff but flexible shaft 52 having an indicator 54, such as a brightly colored sphere mounted to an upper end. The lower end of the shaft 52 is attached to the platform 16 by a mounting bracket 56 preferably fastened to the frame 40. Each embodiment of the bracket 56 is designed to position the indicator 54 directly over the outer corner of the platform frame 40. The first and second embodiments of the bracket 56 shown in FIGS. 6–8 and FIGS. 9–11, respectively, are designed to be mounted inwardly of the true corner. As shown in FIG. 5, these brackets 56 include a partial sleeve 58 oriented at an angle to vertical in order to position the indicator 54 over the corner. The brackets 56 shown in FIGS. 12 through 17 position the entire marker 50 at the corner of the platform 16. The markers 50 provide a constant visible reminder of the location of the cargo carrier. The shaft 52 of the markers 50 is of sufficient length to allow the indicator 54 to be seen by the driver of the vehicle. The markers 50 may be removed from the bracket 56 for storage, while loading the cargo carrier, or when the carrier load interferes with the corner markers 50.

The cargo carrier 10 may also be provided with reflectors or lights 60 to provide other drivers with a visual indication of the cargo carrier 10. Any reflector may be as simple as reflective tape secured to the platform frame 40. The lights 60 can be electronically connected through the lighting harness used while towing trailers to operate the lights in conjunction with the tail lights of the vehicle.

Referring now to FIGS. 6 through 9, the cargo carrier 10 may be selectively converted to a bike rack 100 for transporting and/or storing at least one bicycle 102. The bicycles 102 are supported in an upright position by a stanchion 104 removably mounted to the platform 16. The stanchion 104 includes a support post 106 having a base plate 108 secured to a lower end of the post 106. The base plate 108 is used in conjunction with a backing plate 110 to mount the stanchion 104 to the platform 16. In a preferred embodiment, the base plate 108 and backing plate 110 are used to sandwich the bottom grate 42 and the beam 44 to mount the stanchion 104 to the platform 16. The base plate 108 and the backing plate 110 include apertures 112 for receiving fasteners 114 arranged to pass through the bottom grate 42 of the platform 16. As a result, the stanchion 104 may be positioned fore and aft along the central beam 44 to accommodate the bicycles 102 in different positions as shown in FIGS. 7 and 8.

In order to secure the bicycles 102 to the stanchion 104 a tie-down loop 116 is provided at the upper end of the post 106. A strap, cord, rope or similar tie 118 is used to secure the frames of the bicycles 102 to the tie-down loop 116 of the stanchion 104 as the bicycles 102 are supported on the platform 16. Bumpers 120 may be mounted to the post 106 to prevent scratching of the bicycles 102 by the post 106. For added security, straps 122 extending through the platform 16 are utilized to secure the wheels of the bicycles.

The foregoing detailed description has been given for clearness of understanding only and no unnecessary limitations should be understood therefrom as some modifications will be obvious to those skilled in the art without departing from the scope and spirit of the appended claims.

What is claimed is:

1. A carrier adapted to be mounted to a hitch sleeve of a vehicle to position said carrier proximate the rear of the vehicle, said carrier comprising:

a drawbar having a first end adapted to be selectively received within the vehicle hitch sleeve and a second end, said second end including a bracket;

a platform adjustably mounted to said bracket of said drawbar wherein said platform is selectively adjustable fore and aft relative to said bracket of said drawbar to optimize positioning of said platform relative to the rear of the vehicle;

a support stanchion removably mounted to said platform;

said platform has a central beam received by said bracket, said central beam having a means for selectively engaging said bracket along a plurality of discrete positions to adjust the position of said platform relative to said drawbar;

said bracket includes a U-shaped bracket having an end wall mounted to said second end of said drawbar and a pair of side walls extending upwardly from said end wall and drawbar, said central beam received between said side walls of said U-shaped bracket.

2. The carrier as defined in claim 1 wherein said drawbar includes a vertical offset such that said second end is disposed at a height greater than said first end.

3. The carrier as defined in claim 2 wherein said drawbar includes an angled intermediate segment disposed between said first and second ends to form said vertical offset.

4. The carrier as defined in claim 1 wherein said discrete positions are formed by a plurality of apertures along said central beam.

5. The carrier as defined in claim 4 wherein said apertures defining said discrete positions are formed along only a portion of said central beam.

6. The carrier as defined in claim 1 wherein said platform includes a substantially rectangular frame mounted to said central beam and a bottom wall within said frame.

7. The carrier as defined in claim 1 wherein said support stanchion includes a support post having a base plate, said base plate detachably secured to said platform such that said support stanchion extends upwardly from said platform.

8. The carrier as defined in claim 7 wherein said support post includes tie-down means for securing cargo to said stanchion.

9. A carrier adapted to be mounted to a hitch sleeve of a vehicle to position said carrier proximate the rear of the vehicle, said carrier comprising:

a drawbar having a first end adapted to be selectively received within the vehicle hitch sleeve and a second end vertically offset relative to said first end such that said second end is disposed at a height greater than said first end, said second end including a bracket;

a platform having a frame and a central beam, said central beam received by said bracket to mount said platform to said drawbar, said central beam adjustably mounted to said bracket such that said platform is selectively adjustable fore and aft relative to said drawbar to optimize positioning of said platform relative to the rear of the vehicle;

a vehicle support stanchion detachably mounted to said platform; and said central beam of said platform includes a plurality of apertures defining discrete positions along said beam, said bracket lockingly engaging said central beam at one of said discrete positions whereby said platform is adjustably mounted to said drawbar along a plurality of discrete positions.

10. The carrier as defined in claim 9 wherein said apertures extend along only a portion of the length of said central beam.

11. The carrier as defined in claim 9 wherein said bracket includes a U-shaped bracket having an end wall mounted to said second end of said drawbar and a pair of side walls extending upwardly from said end wall and drawbar, said central beam received between said side walls of said U-shaped bracket.

12. The carrier as defined in claim 9 wherein said support stanchion includes a support post having a base plate, said base plate detachably secured to said platform such that said support stanchion extends upwardly from said platform.

13. The carrier as defined in claim 12 wherein said support post includes tie-down means for securing cargo to said stanchion.

14. The carrier as defined in claim 13 wherein said base plate of said support stanchion cooperates with a backing plate to capture said central beam therebetween, said backing plate secured to said base plate by fasteners.

* * * * *